United States Patent
Ma et al.

(10) Patent No.: US 11,955,597 B2
(45) Date of Patent: Apr. 9, 2024

(54) SOLID ELECTROLYTE, PREPARATION METHOD THEREOF, METAL AIR BATTERY INCLUDING THE SAME, AND ELECTROCHEMICAL DEVICE INCLUDING THE SAME

(71) Applicant: Samsung Electronics Co., Ltd., Suwon-si (KR)

(72) Inventors: Sangbok Ma, Suwon-si (KR); Donghwa Seo, Burlington, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 604 days.

(21) Appl. No.: 16/950,206

(22) Filed: Nov. 17, 2020

(65) Prior Publication Data

US 2021/0167419 A1 Jun. 3, 2021

Related U.S. Application Data

(60) Provisional application No. 62/942,498, filed on Dec. 2, 2019.

(30) Foreign Application Priority Data

Dec. 5, 2019 (KR) .................. 10-2019-0160968

(51) Int. Cl.
*H01M 10/0562* (2010.01)
*H01M 10/052* (2010.01)
(Continued)

(52) U.S. Cl.
CPC ....... *H01M 10/0562* (2013.01); *H01M 4/382* (2013.01); *H01M 12/06* (2013.01);
(Continued)

(58) Field of Classification Search
CPC ............... H01M 4/382; H01M 10/052; H01M 10/0562; H01M 12/06; H01M 12/08;
(Continued)

(56) References Cited

U.S. PATENT DOCUMENTS 6,994,807 B2 2/2006 Tanner
10,128,533 B2 * 11/2018 Yamamoto ........... C01G 17/006
(Continued)

FOREIGN PATENT DOCUMENTS

| JP | 6451672 B2 | 1/2019 |
| KR | 1020170067081 A | 6/2017 |
| KR | 1020200041663 A | 4/2020 |

OTHER PUBLICATIONS

E. A. Sherstobitova et al., "Bottle-necked ionic transport in Li2ZrO3: high temperature neutron diffraction and impedance spectroscopy," Electrochimica Acta, May 17, 2016, pp. 574-581, vol. 209.
(Continued)

*Primary Examiner* — Ula C Ruddock
(74) *Attorney, Agent, or Firm* — Cantor Colburn LLP

(57) ABSTRACT

A solid electrolyte including: an oxide represented by Formula 1, Formula 2, Formula 3, or a combination thereof, $$Li_{2+4x}M1_{1-x}O_3 \qquad \text{Formula 1}$$

wherein, in Formula 1, M1 is hafnium, titanium, zirconium, or a combination thereof, and $0<x<1$;

$$Li_{2-y(a-4)}M1_{1-y}M2^a{}_yO_3 \qquad \text{Formula 2}$$

wherein, in Formula 2, M1 is hafnium, titanium, zirconium, or a combination thereof, M2 is at least one element having an oxidation number of a, and wherein a is an integer from 1 to 6, and $0<y<1$; or $$Li_{2-z}M1O_{3-z}X_z \qquad \text{Formula 3}$$

(Continued)

wherein, in Formula 3, M1 is hafnium, titanium, zirconium, or a combination thereof, X is a halogen, a pseudohalogen, or a combination thereof, and $0 < z < 2$.

29 Claims, 6 Drawing Sheets

(51) Int. Cl.
  *H01M 4/38* (2006.01)
  *H01M 12/06* (2006.01)
  *H01M 12/08* (2006.01)
  *H01M 50/431* (2021.01)

(52) U.S. Cl.
  CPC ......... *H01M 12/08* (2013.01); *H01M 50/431* (2021.01); *H01M 10/052* (2013.01); *H01M 2300/0071* (2013.01); *H01M 2300/0077* (2013.01)

(58) Field of Classification Search
  CPC ....... H01M 50/431; H01M 2300/0071; H01M 2300/0077
  See application file for complete search history.

(56) References Cited

U.S. PATENT DOCUMENTS

| | | | |
|---|---|---|---|
| 2015/0024273 A1* | 1/2015 | Yamazaki | C01G 53/50 427/126.3 |
| 2018/0205087 A1* | 7/2018 | Ishikawa | H01M 4/366 |
| 2018/0375151 A1* | 12/2018 | Gaben | H01M 4/139 |
| 2021/0376378 A1* | 12/2021 | Jung | C01G 15/006 |
| 2022/0231325 A1* | 7/2022 | Jung | H01M 10/0562 |

OTHER PUBLICATIONS

Extended European Search Report dated May 3, 2021 of EP App. No. 20207985.1.

Yasuhiro Harada et al., "Lithium ion conductivity of A-site deficient perovskite solid solutions," Journal of Power Sources, Sep. 1999, pp. 777-781, vol. 81-82.

* cited by examiner

SOLID ELECTROLYTE, PREPARATION METHOD THEREOF, METAL AIR BATTERY INCLUDING THE SAME, AND ELECTROCHEMICAL DEVICE INCLUDING THE SAME

CROSS-REFERENCE TO RELATED APPLICATIONS

This application claims priority to and the benefit of U.S. Provisional Application No. 62/942,498, filed on Dec. 2, 2019, in the U.S. Patent and Trademark Office, and Korean Patent Application No. 10-2019-0160968, filed on Dec. 5, 2019, in the Korean Intellectual Property Office, and all the benefits accruing therefrom under 35 U.S.C. § 119, the contents of which are incorporated herein in their entireties by reference.

BACKGROUND

1. Field

The present disclosure relates to a solid electrolyte, a preparation method thereof, a metal air battery including the solid electrolyte, and an electrochemical device including the solid electrolyte.

2. Description of Related Art

A lithium air battery uses lithium metal as an anode active material, and because air is used as a cathode active material, there is no need to store air and therefore a lithium air battery may function as a high-capacity battery. The theoretical specific energy of a lithium air battery is 3500 watt-hours per kilogram (Wh/kg) or greater, which is very high.

Nonetheless, there remains a need for an improved solid electrolyte for a lithium-air battery.

SUMMARY

Provided is a solid electrolyte that is stable in the presence of moisture and lithium metal, and preparation methods thereof.

Provided is a lithium air battery including the solid electrolyte.

Provided is an electrochemical device including the solid electrolyte.

Additional aspects will be set forth in part in the description which follows and, in part, will be apparent from the description.

According to an aspect, a solid electrolyte includes an oxide represented by Formula 1, Formula 2, Formula 3, or a combination thereof,

$$Li_{2+4x}M1_{1-x}O_3 \quad \text{Formula 1}$$

wherein, in Formula 1, M1 is hafnium (Hf), titanium (Ti), zirconium (Zr), or a combination thereof, and $0<x<1$;

$$Li_{2-y(a-4)}M1_{1-y}M2^a_y O_3 \quad \text{Formula 2}$$

wherein, in Formula 2,

M1 is hafnium (Hf), titanium (Ti), zirconium (Zr), or a combination thereof,

M2 is at least one element having an oxidation number of a, and wherein a is an integer from 1 to 6, and $0<y<1$; or

$$Li_{2-z}M1O_{3-z}X_z \quad \text{Formula 3}$$

wherein, in Formula 3,

M1 is hafnium (Hf), titanium (Ti), zirconium (Zr), or a combination thereof,

X is a halogen, a pseudohalogen, or a combination thereof, and $0<z<2$.

According to an aspect, a metal air battery includes: a cathode, an anode, and an electrolyte between the cathode and the anode, wherein the cathode, the anode, the electrolyte, or a combination thereof, includes the solid electrolyte.

According to an aspect, an electrochemical device includes the solid electrolyte.

The electrochemical device includes an anode, a cathode and the solid electrolyte between the anode and the cathode.

The electrochemical device may include a battery, an accumulator, a supercapacitor, a fuel cell, a sensor, or an electrochromic device.

According to an aspect, a method of preparing a solid electrolyte includes mixing a lithium precursor, and an M1 precursor to prepare a precursor mixture; and heat-treating the precursor mixture to prepare the solid electrolyte.

An M2 precursor, and an X precursor are further added to the precursor mixture.

Also disclosed is a protection layer for a lithium battery, the protection layer including the solid electrolyte, wherein the solid electrolyte is disposed on a cathode or an anode.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
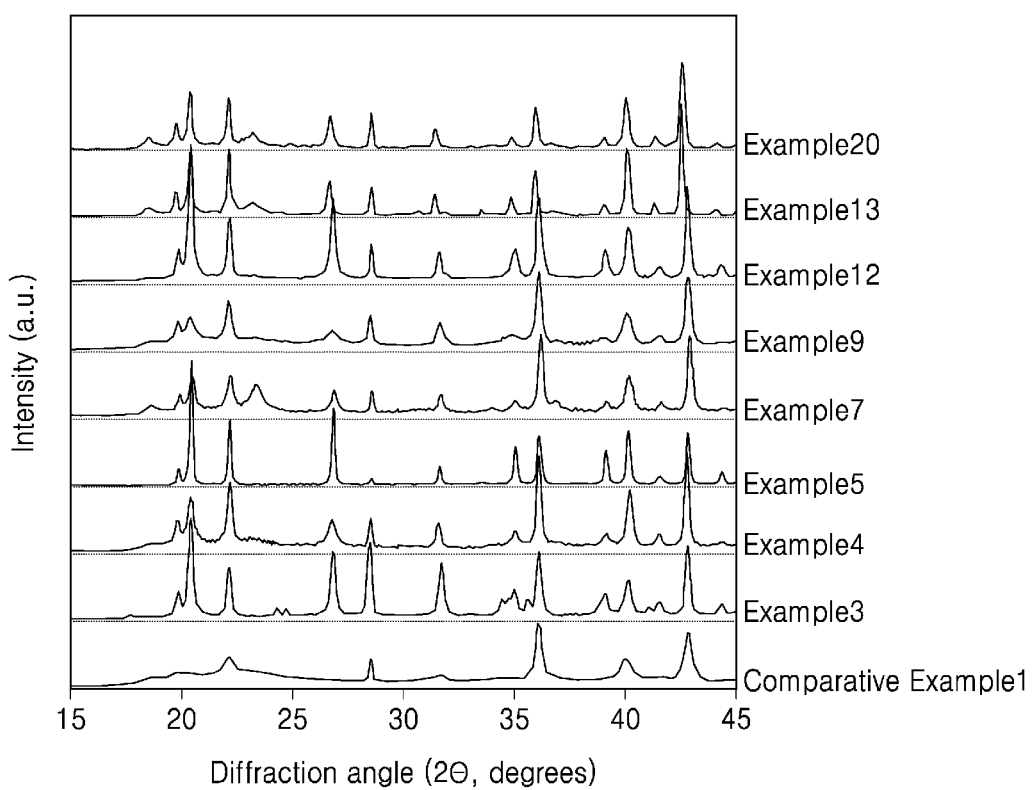
FIG. 1 is a graph of intensity (arbitrary units (a.u.)) versus diffraction angle (°2θ) and illustrates the results of X-ray diffraction (XRD) analysis of solid electrolytes of Examples 3 to 5, 7, 9, 12, 13, 20, and Comparative Example 1, when analyzed by X-ray diffraction (XRD) using Cu Kα radiation.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The solid electrolyte of a lithium air battery may be unstable in the presence of LiOH, which is a discharge product of the lithium-air battery. The ion conductivity of the solid electrolyte decreases under strong basic conditions, including the presence of lithium hydroxide. Therefore, there is a need for an improved solid electrolyte having improved stability.

Hereinafter, a solid electrolyte, a preparation method thereof, a metal air battery including the solid electrolyte, and an electrochemical device including the solid electrolyte will be described in more detail.

A solid electrolyte is provided including an oxide represented by Formula 1, Formula 2, Formula 3, or a combination thereof.

$$Li_{2+4x}M1_{1-x}O_3 \qquad \text{Formula 1}$$

In Formula 1, M1 is hafnium (Hf), titanium (Ti), zirconium (Zr), or a combination thereof, and 0<x<1.

$$Li_{2-y(a-4)}M1_{1-y}M2^a{}_yO_3 \qquad \text{Formula 2}$$

In Formula 2, M1 is hafnium (Hf), titanium (Ti), zirconium (Zr), or a combination thereof, M2 is at least one element having an oxidation number of a, wherein a is an integer from 1 to 6, and 0<y<1.

$$Li_{2-z}M1O_{3-z}X_z \qquad \text{Formula 3}$$

In Formula 3, M1 is hafnium (Hf), titanium (Ti), zirconium (Zr), or a combination thereof, X is a halogen, a pseudohalogen, or a combination thereof, and 0<z<2.

In Formulae 1 to 3, each M1 is independently hafnium (Hf), titanium (Ti), zirconium (Zr), or a combination thereof.

In Formula 2, M2 is aluminum (Al), gallium (Ga), indium (In), niobium (Nb), tantalum (Ta), vanadium (V), yttrium (Y), lanthanum (La), scandium (Sc), magnesium (Mg), Calcium (Ca), strontium (Sr), barium (Ba), zinc (Zn), cadmium (Cd), tungsten (W), molybdenum (Mo), vacancy, or a combination thereof.

In Formula 2, a is an oxidation number of M2, and is, for example, 2, 3, 5, or 6.

In Formula 3, the halogen may be Cl, Br, F, I, or a combination thereof.

The solid electrolyte satisfies a charge balance to have a neutral state.

The solid electrolyte is suitable for a lithium air battery and has excellent stability in the presence of lithium metal, and the reversibility of the lithium air battery is stable in humid or atmospheric conditions. While not wanting to be bound by theory, it is understood that the improved stability and reversibility is because the solid electrolyte is an excellent ion conductor, and is stable against moisture and a strong base. Therefore, the stability of the solid electrolyte is improved in the presence of lithium hydroxide (LiOH), which is a discharge product, and moisture.

However, solid electrolytes in the prior art do not have sufficient stability to lithium, and have low stability to a strong base such as lithium hydroxide and moisture, thereby lowering ion conductivity. Accordingly, the need for a new solid electrolyte capable of solving such problem is increasing.

A solid electrolyte including an oxide represented by Formulae 1 to 3, containing an element such as hafnium, titanium or zirconium, provides improved stability in the presence of both moisture and lithium.

The oxide is an ion conductor having a thermodynamically stable composition. While not wanting to be bound by theory, it is understood that the oxide of Formula 1 provides improved ion conductivity by introducing a Li vacancy for lithium movement and having an excess of lithium, or by doping the oxide with other transition metals. A solid electrolyte including the oxide of Formula 3 has excellent ion conductivity when Formula 3 includes an anion that is a halogen, a pseudohalogen, or a combination thereof.

The solid electrolyte contains an oxide of Formulae 1 to 3 and provides improved phase stability. In particular, the solid electrolyte has excellent stability to moisture under strong basic conditions, for example, when pH 12 to 13, and maintains excellent ion conductivity.

Each of the oxides of Formulae 1 to 3 contains an element such as hafnium, titanium or zirconium, which is not reduced by lithium, and has very high stability in the presence of lithium metal. While not wanting to be bound by theory, it is understood that the hafnium, titanium or zirconium results in an interface between the solid electrolyte and the anode having improved stability. Further, when the solid electrolyte includes the oxide of Formulae 1 to 3, the solid electrolyte has improved stability in the presence of moisture and a strong base. Therefore, an interface between the solid electrolyte and the cathode is also stabilized.

The solid electrolyte according to an embodiment has excellent ion conductivity at room temperature and has excellent stability in the presence of lithium metal and moisture. Accordingly, a metal air battery having improved reversibility under humidified or air conditions may be manufactured.

The metal air battery may be a lithium air battery configured to use oxygen from the air or any other suitable gas as a cathode active material, and use lithium as an anode.

In Formulae 1 to 3, M1 may be a tetravalent cation element, for example, hafnium (Hf), titanium (Ti), zirconium (Zr), or a combination thereof.

In Formula 2, M2 may substitute on portion of the crystallographic sites of M1 in a crystal structure of the oxide. M2 is an element having an oxidation number of a, and may be a monovalent element to a hexavalent element, or a combination thereof. In Formula 2, M2 may be a divalent element, a trivalent element, a pentavalent element, a hexavalent element, a vacancy, or a combination thereof.

M2 may be aluminum (Al), gallium (Ga), indium (In), niobium (Nb), tantalum (Ta), vanadium (V), yttrium (Y), lanthanum (La), scandium (Sc), magnesium (Mg), calcium (Ca), strontium (Sr), barium (Ba), zinc (Zn), cadmium (Cd), tungsten (W), molybdenum (Mo), or a combination thereof.

In Formula 3, X may be a halogen, a pseudohalogen, or a combination thereof.

As used herein, a "pseudohalogen" refers to a group or molecule including two or more electronegative atoms resembling a halogen in a free state, and provides an anion similar to a halogen ion. The pseudohalogen may be, for example, cyanide, cyanate, thiocyanate, azide, or a combination thereof.

X may be two or more halogens. The halogen may substitute on a portion of the crystallographic sites of oxygen in a crystal structure of Formula 1.

X may be chlorine (Cl), bromine (Br), fluorine (F), cyanide, cyanate, thiocyanate, azide, or a combination thereof.

In Formula 1, x is about 0.01 to about 0.99, about 0.01 to about 0.97, about 0.01 to about 0.95, or about 0.01 to about 0.9.

In Formula 2, y is greater than 0 to less than about 1, about 0.01 to about 0.9, about 0.03 to about 0.85, or about 0.05 to about 0.8.

In Formula 2, M2 may be Y, Al, Ta, Mg, Zn or a combination thereof.

In Formula 1, x is greater than 0 to less than about 1, about 0.01 to about 0.9, about 0.05 to about 0.8, about 0.1 to about 0.6, or about 0.2 to about 0.5. Further, 2+4x is greater than about 2 to less than about 6, about 2.05 to about 5.5, about 2.05 to about 5, about 2.1 to about 4, about 2.1 to about 3, or about 2.1 to about 2.5. In Formula 2, y is greater than 0 to less than about 1, about 0.01 to about 0.9, about 0.05 to about 0.8, about 0.07 to about 0.5, about 0.09 to about 0.3, or about 0.1 to about 0.2. In Formula 2, a is an oxidation number of 1 to 6, for example, 2, 3, 5, or 6.

In Formula 3, z is greater than 0 to about 1, about 0.05 to about 1, about 0.07 to about 0.9, about 0.09 to about 0.8, or about 0.1 to about 0.5.

The oxide of Formula 1 may be an oxide represented by Formula 4, an oxide represented by Formula 5, or a combination thereof.

$$Li_{2+4x}Hf_{1-x}O_3 \qquad \text{Formula 4}$$

In Formula 4, $0.01 \leq x \leq 0.9$.

$$Li_{2+4x}Zr_{1-x}O_3 \qquad \text{Formula 5}$$

In Formula 5, $0.01 \leq x \leq 0.9$.

The oxide of Formula 2 may be an oxide represented by Formula 6, an oxide represented by Formula 7, or a combination thereof.

$$Li_{2-y(a-4)}Hf_{1-y}M2^a_yO_3 \qquad \text{Formula 6}$$

In Formula 6, M2 is aluminum (Al), gallium (Ga), indium (In), niobium (Nb), tantalum (Ta), vanadium (V), yttrium (Y), lanthanum (La), scandium (Sc), magnesium (Mg), calcium (Ca), strontium (Sr), barium (Ba), zinc (Zn), cadmium (Cd), tungsten (W), molybdenum (Mo), or a combination thereof. In Formula 6, a is an oxidation number of M2, and a may be an integer from 1 to 6, and $0.05 \leq y \leq 0.9$.

$$Li_{2-y(a-4)}Zr_{1-y}M2^a_yO_3 \qquad \text{Formula 7}$$

In Formula 7, M2 is aluminum (Al), gallium (Ga), indium (In), niobium (Nb), tantalum (Ta), vanadium (V), yttrium (Y), lanthanum (La), scandium (Sc), magnesium (Mg), calcium (Ca), strontium (Sr), barium (Ba), zinc (Zn), cadmium (Cd), tungsten (W), molybdenum (Mo), or a combination thereof. In Formula 7, a is an oxidation number of M2 and is an integer from 1 to 6, for example, 2, 3, 5 or 6, and 0.05≤y≤0.9.

The oxide of Formula 3 may be an oxide represented by Formula 8, an oxide represented by Formula 9, or a combination thereof.

  Formula 8

In Formula 8, X is a halogen, a pseudohalogen or a combination thereof, and 0.05≤z≤1.

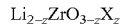  Formula 9

In Formula 9, X is a halogen, a pseudohalogen or a combination thereof, and 0.05≤z≤1.

In Formulae 4 and 5, each x is independently about 0.1 to about 0.8, about 0.1 to about 0.6, or about 0.1 to about 0.5.

In Formulae 6 and 7, each y is independently about 0.1 to about 0.8, about 0.1 to about 0.5, about 0.1 to about 0.3, or about 0.1 to about 0.2. In Formulae 6 and 7, a is an oxidation number of M2, and a is 1 to 6, for example, 2, 3, 5, or 6.

In Formulae 8 and 9, each z is independently about 0.1 to about 0.9, about 0.1 to about 0.8, or about 0.1 to about 0.5.

The solid electrolyte may have a phase having a rock salt crystal structure. The solid electrolyte may have a layered rock salt crystal structure, and may have a C2/c space group (space group 15). Such characteristics may be confirmed through X-ray diffraction (XRD) analysis.

In the solid electrolyte according to an embodiment, a spectrum has a diffraction peaks from, e.g., associated with, a (02$\bar{1}$) crystal plane, a (11$\bar{2}$) crystal plane, or a (22$\bar{1}$) crystal plane, when analyzed by X-ray diffraction using Cu Kα radiation.

According to an embodiment, the oxide has a diffraction peak at a diffraction angle of 26.7±0.5 °2θ, 35±0.5 °2θ, and/or 39±0.5 °2θ, other than a diffraction peak of a Li$_2$HfO$_3$-based oxide, when analyzed by X-ray diffraction using Cu Kα radiation.

A diffraction peak is present at a diffraction angle of about 26.7 °2θ, about 35 °2θ, about 39 °2θ, or a combination thereof, when analyzed by X-ray diffraction using Cu Kα radiation.

Among the diffraction peaks, the first peak having a diffraction angle 2θ of 26.7±0.5 °2θ is associated with the (02$\bar{1}$) crystal plane of the oxide of Formula 1, and the second peak having a diffraction angle 2θ of 35±0.5 °2θ is associated with the (11$\bar{2}$) crystal plane of the oxide of Formula 1. The third peak having a diffraction angle of 39±0.5 °2θ is associated with the (22$\bar{1}$) crystal plane of the oxide of Formula 1.

The oxide represented by Formula 1 may be Li$_{2.2}$Hf$_{0.95}$O$_3$, Li$_{1.9}$HfF$_{0.1}$O$_{2.9}$, Li$_{1.8}$HfF$_{0.2}$O$_{2.8}$, Li$_{1.5}$HfF$_{0.5}$O$_{2.5}$, Li$_{1.9}$HfCl$_{0.1}$O$_{2.9}$, Li$_{1.8}$HfCl$_{0.2}$O$_{2.8}$, Li$_{1.5}$HfCl$_{0.5}$O$_{2.5}$, Li$_{1.9}$HfF$_{0.05}$Cl$_{0.05}$O$_{2.9}$, Li$_{1.8}$HfF$_{0.1}$Cl$_{0.2}$O$_{2.8}$, Li$_{1.8}$HfBr$_{0.1}$Cl$_{0.1}$O$_{2.8}$, Li$_{1.5}$HfF$_{0.25}$Cl$_{0.25}$O$_{2.5}$, Li$_{1.5}$HfBr$_{0.25}$Cl$_{0.25}$O$_{2.5}$, Li$_{2.2}$Hf$_{0.8}$Y$_{0.2}$O$_3$, Li$_{2.2}$Hf$_{0.8}$La$_{0.2}$O$_3$, Li$_{2.2}$Hf$_{0.8}$Sc$_{0.2}$O$_3$, Li$_{2.2}$Hf$_{0.8}$Al$_{0.2}$O$_3$, Li$_{1.8}$Hf$_{0.8}$Ta$_{0.2}$O$_3$, Li$_{1.8}$Hf$_{0.8}$Nb$_{0.2}$O$_3$, Li$_{1.8}$Hf$_{0.8}$V$_{0.2}$O$_3$, Li$_{2.2}$Hf$_{0.9}$Mg$_{0.1}$O$_3$, Li$_{2.2}$Hf$_{0.9}$Ca$_{0.1}$O$_3$, Li$_{2.2}$Hf$_{0.9}$Sr$_{0.1}$O$_3$, Li$_{2.2}$Hf$_{0.9}$Ba$_{0.1}$O$_3$, Li$_{2.2}$Hf$_{0.9}$Zn$_{0.1}$O$_3$, Li$_{2.2}$Hf$_{0.9}$Cd$_{0.1}$O$_3$, Li$_{2.2}$Zr$_{0.95}$O$_3$, Li$_{1.9}$ZrF$_{0.1}$O$_{2.9}$, Li$_{1.8}$ZrF$_{0.2}$O$_{2.8}$, Li$_{1.5}$ZrF$_{0.5}$O$_{2.5}$, Li$_{1.9}$ZrCl$_{0.1}$O$_{2.9}$, Li$_{1.8}$ZrCl$_{0.2}$O$_{2.8}$, Li$_{1.5}$ZrCl$_{0.5}$O$_{2.5}$, Li$_{1.9}$ZrF$_{0.05}$Cl$_{0.05}$O$_{2.9}$, Li$_{1.9}$ZrBr$_{0.05}$Cl$_{0.05}$O$_{2.9}$, Li$_{1.8}$ZrF$_{0.1}$Cl$_{0.1}$O$_{2.8}$, Li$_{1.8}$ZrBr$_{0.1}$Cl$_{0.1}$O$_{2.8}$, Li$_{1.5}$ZrF$_{0.25}$Cl$_{0.25}$O$_{2.5}$, Li$_{1.5}$ZrBr$_{0.25}$Cl$_{0.25}$O$_{2.5}$, Li$_{2.2}$Zr$_{0.8}$Y$_{0.2}$O$_3$, Li$_{2.2}$Zr$_{0.8}$La$_{0.2}$O$_3$, Li$_{2.2}$Zr$_{0.8}$Sc$_{0.2}$O$_3$, Li$_{2.2}$Zr$_{0.8}$Al$_{0.2}$O$_3$, Li$_{1.8}$Zr$_{0.8}$Ta$_{0.2}$O$_3$, Li$_{1.8}$Zr$_{0.8}$Nb$_{0.2}$O$_3$, Li$_{1.8}$Zr$_{0.8}$V$_{0.2}$O$_3$, Li$_{2.2}$Zr$_{0.9}$Mg$_{0.1}$O$_3$, Li$_{2.2}$Zr$_{0.9}$Ca$_{0.1}$O$_3$, Li$_{2.2}$Zr$_{0.9}$Sr$_{0.1}$O$_3$, Li$_{2.2}$Zr$_{0.9}$Ba$_{0.1}$O$_3$, Li$_{2.2}$Zr$_{0.9}$Zn$_{0.1}$O$_3$, Li$_{2.2}$Zr$_{0.9}$Cd$_{0.1}$O$_3$, Li$_{2.2}$Hf$_{0.8}$Ta$_{0.2}$O$_3$, Li$_{2.2}$Hf$_{0.8}$Nb$_{0.2}$O$_3$, Li$_{2.2}$Hf$_{0.8}$V$_{0.2}$O$_3$, Li$_{2.2}$Zr$_{0.8}$Ta$_{0.2}$O$_3$, Li$_{2.2}$Zr$_{0.8}$Nb$_{0.2}$O$_3$, Li$_{2.2}$Zr$_{0.8}$V$_{0.2}$O$_3$, or a combination thereof.

The solid electrolyte according to an embodiment has an ion conductivity of about 1×10$^{-10}$ Siemens per centimeter (S/cm) or more, about 1×10$^{-5}$ Siemens per centimeter (S/cm) or more, about 3.0×10$^{-5}$ S/cm or more, or about 3.0×10$^{-5}$ S/cm to about 1×10$^{-2}$ S/cm at room temperature (25° C.). For example, the ion conductivity of the solid electrolyte may be about 1×10$^{-5}$ S/cm to about 1×10$^{-2}$ S/cm, about 2×10$^{-5}$ S/cm to about 1×10$^{-2}$ S/cm, about 2×10$^{-5}$ S/cm to about 9×10$^{-3}$ S/cm, about 4×10$^{-5}$ S/cm to about 9×10$^{-3}$ S/cm, about 4×10$^{-5}$ S/cm to about 5×10$^{-3}$ S/cm, about 5×10$^{-5}$ S/cm to about 2×10$^{-3}$ S/cm, about 6×10$^{-5}$ S/cm to about 1×10$^{-3}$ S/cm, about 7×10$^{-5}$ S/cm to about 9×10$^{-4}$ S/cm, about 8×10$^{-5}$ S/cm to about 8×10$^{-4}$ S/cm, about 9×10$^{-5}$ S/cm to about 7×10$^{-4}$ S/cm, about 1×10$^{-4}$ S/cm to about 7×10$^{-4}$ S/cm, about 5×10$^{-4}$ S/cm to about 8×10$^{-4}$ S/cm, or about 1×10$^{-4}$ S/cm to about 5×10$^{-4}$ S/cm. Ionic conductivity may be determined by a complex impedance method at 20° C., further details of which can be found in J.-M. Winand et al., "Measurement of Ionic Conductivity in Solid Electrolytes," Europhysics Letters, vol. 8, No. 5, p. 447-452, 1989. Without wishing to be bound by theory, it is understood that because the solid electrolyte has such high ion conductivity, the internal resistance of a lithium air battery containing the solid electrolyte is reduced.

The solid electrolyte may be present in the form of a particle. The solid electrolyte particle has an average particle diameter of about 5 nanometers (nm) to about 500 micrometers (μm), about 100 nm to about 15 μm, or about 300 nm to about 10 μm. The particle diameter may be determined by microscopy, e.g., SEM, or by light scattering.

The solid electrolyte has a specific surface area of about 0.01 square meter per gram (m$^2$/g) to about 1000 m$^2$/g, about 0.05 m$^2$/g to about 500 m$^2$/g, about 0.1 m$^2$/g to about 250 m$^2$/g, or about 0.5 m$^2$/g to about 100 m$^2$/g. Specific surface area may be determined as described in E. P. Barrett, L. G. Joyner, P. P. Halenda, "The determination of pore volume and area distributions in porous substances. I. Computations from nitrogen isotherms," J. Am. Chem. Soc. (1951), 73, 373-380, the content of which is incorporated herein by reference in its entirety.

The solid electrolyte according to an embodiment has a pellet density of about 2.6 g/cc to about 5.1 g/cc, about 2.8 g/cc to about 5.05 g/cc, about 3 g/cc to about 5.0 g/cc, about 4 g/cc to about 4.95 g/cc, about 4.3 g/cc to about 4.9 g/cc, about 4.4 g/cc to about 4.85 g/cc, or about 4.5 g/cc to about 4.80 g/cc. When using the solid electrolyte having a pellet density in this range, the resulting product obtained after the pressing process for preparing a solid electrolyte is dense, e.g., sufficiently dense as to be impervious to a gas, e.g., air, water vapor, or a liquid such as water. Thus, when preparing a film-shaped solid electrolyte using the resulting product, water or air does not pass through the film-shaped solid electrolyte, and thus physical properties of the solid electrolyte are improved.

The pressing process is carried out at about 1 megapascal (MPa) to about 200 MPa, about 5 MPa to about 150 MPa, or about 10 MPa to about 120 MPa.

A method of preparing a solid electrolyte according to an embodiment is further described.

A lithium precursor and an M1 precursor are mixed to prepare a precursor mixture. Here, the M2 precursor and an X precursor are optionally added to the precursor mixture.

Subsequently, the precursor mixture is heat-treated to prepare a solid electrolyte that includes an oxide represented by Formulae 1 to 3, or a combination thereof. The M1 is as defined in Formulae 1 to 3, the M2 is as defined in Formula 2, and the X is as defined in Formula 3.

A solvent may be added to the mixture.

Any suitable solvent may be used as long as it can dissolve or disperse the lithium precursor, the M1 precursor, the M2 precursor, and the X precursor. The solvent may be, for example, ethanol, water, ethylene glycol, isopropanol, or a combination thereof.

The mixing may be carried out using a suitable method such as milling, blending or stirring. The milling may be carried out using a ball mill, an air jet mill, a bead mill, or a roll mill.

Subsequently, the precursor mixture is heat-treated.

The heat-treating may comprise a primary heat-treating. In the primary heat-treatment of the mixture, the temperature is increased at a rate of about 1° C./min to about 10° C./min, and the primary heat-treatment temperature is about 400° C. to about 950° C. or about 600° C. to about 900° C. When the temperature is increased at a rate within this range in the primary heat-treatment, heat-treatment may be sufficiently performed to obtain a solid electrolyte having a desired crystal structure. The temperature of the primary heat-treatment may be about 450° C. to about 900° C., about 500° C. to about 850° C., about 550° C. to about 800° C., or about 600° C. to about 750° C.

The primary heat-treatment may be carried out under oxygen, or an oxidative gas atmosphere. Air may be used. The inert gas atmosphere may be argon, helium, nitrogen, or a combination thereof. The primary heat-treatment time is changed depending on the primary heat-treatment temperature, and is, for example, about 1 hour to about 20 hours, about 4 hours to about 15 hours, or about 9 hours to about 13 hours.

Each of the M1 precursor and the M2 precursor may contain an oxide, a carbonate, a chloride, a phosphate, a hydroxide, a nitrate, or a combination thereof, and may be, for example, hafnium oxide, zirconium oxide, yttrium oxide, hafnium nitrate, hafnium sulfate, zirconium nitrate, zirconium sulfate, aluminum oxide, tantalum oxide, magnesium oxide, zinc oxide, gallium oxide, indium oxide, niobium oxide, vanadium oxide, lanthanum oxide, scandium oxide, calcium oxide, strontium oxide, barium oxide, cadmium oxide, or a combination thereof.

The X precursor may be, for example, lithium chloride, lithium fluoride, lithium bromide or a combination thereof. The lithium precursor may be, for example, lithium oxide, lithium carbonate, lithium chloride, lithium sulfide, lithium nitrate, lithium phosphate, lithium hydroxide, or a combination thereof.

The content of the lithium precursor, M1 precursor, M2 precursor and X precursor is stoichiometrically selected to obtain the desired oxide, e.g., an oxide represented by Formulae 1 to 3.

Subsequently, the heat-treated precursor mixture is pulverized to obtain a pulverized product. The pulverized product is, for example, a powder. The pulverized product, e.g., a powder or particle, is obtained by pulverizing and may have a particle size of 10 μm or less, e.g. about 0.1 μm to about 10 μm. When the size of the powder particle is within this e range, pulverizing and mixing are sufficiently performed because the size thereof is small, so that the formation of crystal phase is easily performed. As used herein, the "size" refers to an average diameter when particles are spherical, and refers to a major axis length when particles are non-spherical. The size may be measured using a scanning electron microscope (SEM) or by a particle size analyzer using light scattering, for example.

Subsequently, secondary heat-treatment of the pulverized product is carried out. In the secondary heat-treatment of the pulverized product, the temperature is increased at a rate of about 1° C./min to about 10° C./min. The secondary heat-treatment may be carried out at 500° C. to about 1300° C., about 700° C. to about 1200° C., about 800° C. to about 1100° C., or about 900° C. to about 1000° C. The heat-treatment may be for a predetermined amount of time, e.g. for about 1 hour to about 24 hours, for about 2 hours to about 20 hours, for about 4 hours to about 16 hours, or for about 6 hours to about 12 hours.

According to an embodiment, the secondary heat-treatment may be carried out at a temperature which is greater than the primary heat-treatment temperature. In the process of secondarily heat-treating the pulverized product, the pulverized product may be pressed to form a pellet. The pressing process is carried out at about 1 MPa to about 200 MPa, about 5 MPa to about 150 MPa, or about 10 MPa to about 120 MPa. According to an embodiment, when the solid electrolyte has a pellet density ranging from, about 2 g/cc to about 6 g/cc or about 2.6 g/cc to about 5.1 g/cc, a film-shaped solid electrolyte can be formed from the pellet, which has improved impermeability to air or water.

As described above, when the secondary heat-treatment of the pulverized product is carried out on the pellet, the diffusion distance of a material being heat-treated is shortened, such that a desired solid electrolyte may be easily prepared. When the secondary heat-treatment proceeds in a power particle form, i.e. not in the pellet form, the oxides of Formulae 1 to 3 may be made, but a longer heat-treatment time and higher temperature may be used, because the diffusion distance is increased in the powder particle compared to the diffusion distance in the pellet form.

The secondary heat-treatment may be determined by the valence or oxidation number desired of M1 and M2, and may be carried out under an oxidative gas atmosphere, a reducing gas atmosphere, or an inert gas atmosphere. The oxidative gas atmosphere may be formed using air or oxygen, the reducing gas atmosphere may be formed using a reducing gas such as hydrogen, and inert gas atmosphere may be formed using an inert gas such as nitrogen, argon, or helium.

The secondary heat-treatment time may be adjusted depending on the secondary heat-treatment temperature, and is, for example, about 1 hour to about 50 hours or about 6 hours to about 48 hours.

After the secondary heat-treatment, an oxide of Formulae 1 to 3 is formed. When the temperature increases during the primary heat-treatment and the second heat-treatment are within the above ranges, each heat-treatment sufficiently proceeds, so that not only a desired crystal structure is formed but also synthesis time is short and thus economical.

The solid electrolyte according to an embodiment may be used in a metal air battery, for example, a lithium air battery. Further, the solid electrolyte may be used as an electrolyte of a lithium battery such as an all-solid battery. The solid electrolyte may be used in the production of a cathode and an anode of a battery, and may also be used in surface coating of a cathode and an anode.

Figure 6:
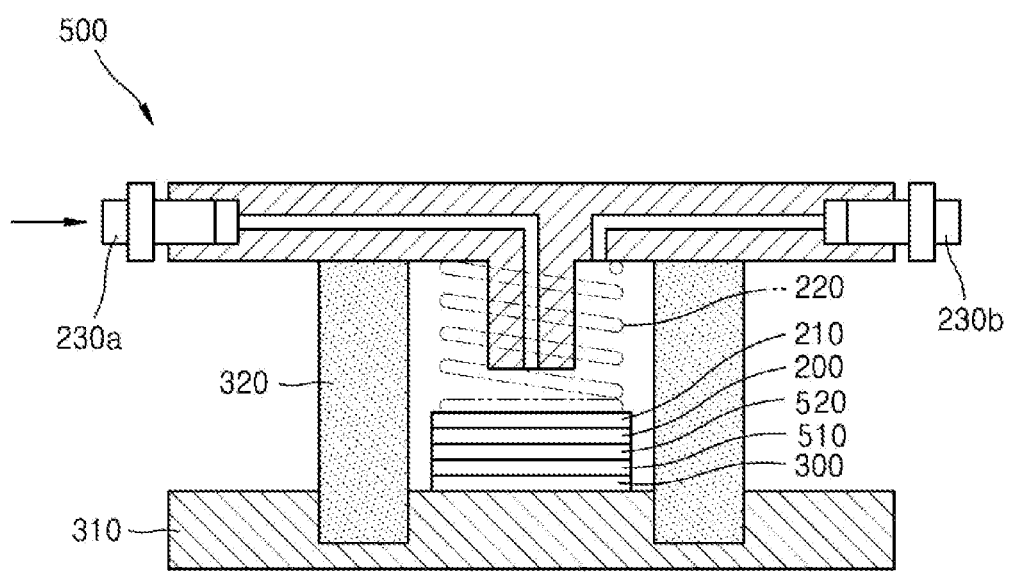
FIG. 6 is a schematic cross-sectional view of an embodiment illustrating a structure of a lithium air battery.

The surface coating may be a protection layer. Referring to FIG. 6, a lithium air battery 500 may include the protection layer 520 that may comprise the solid electrolyte and may be disposed on the cathode 200. The lithium air battery 500 may include the protection layer 510 that comprises the solid electrolyte and may be disposed on the anode. According to another aspect, there is an electrochemical device including the solid electrolyte provided. The solid electrolyte may be chemically stable, may be excellent in ion conductivity, and may be improved in stability to moisture and strong base, thereby obtaining an electrochemical device in which degradation is efficiently suppressed.

The electrochemical device is, but is not limited to, a battery, an accumulator, a supercapacitor, a fuel cell, a sensor, or an electrochromic device. Any suitable electrochemical device may be used.

The battery is, for example, a primary battery or a secondary battery. Examples of the battery may include, but are not limited to, a lithium battery or a sodium battery. Any suitable battery may be used. Examples of the lithium battery may include, but are not limited to, a lithium ion battery or a lithium air battery. Any suitable lithium battery may be used. Examples of the electrochromic device may include, but are not limited to, an electrochemical mirror, an electrochemical window, or an electrochemical screen. Any suitable electrochromic device may be used.

The electrochemical device is, for example, a lithium metal battery using a metal such as lithium or zinc as an anode, or a lithium air battery using lithium as an anode. The lifetime of such a lithium air battery is improved.

According to an embodiment, the cathode is porous. When the cathode is porous, air, oxygen, or the like easily diffuses into the cathode.

A metal air battery according to an embodiment includes a cathode, an anode, and an electrolyte between the cathode and the anode, wherein at least one of the cathode, the anode, or the electrolyte comprises the solid electrolyte.

According to an embodiment, the electrolyte may include the solid electrolyte.

According to an embodiment, the cathode or the anode may include the solid electrolyte. The anode may include lithium.

Since the lithium air battery includes the solid electrolyte, stability to moisture and strong base is improved, and improved reversibility under humidified or air conditions, thereby enabling the lithium air battery to operate more efficiently. Further, structural stability of the lithium air battery is improved, and degradation thereof is suppressed.

The lithium air battery may include a cathode, and the cathode may be disposed on a cathode current collector.

The cathode may contain the solid electrolyte. The content of the solid electrolyte is about 2 part by weight to about 70 parts by weight, about 3 parts by weight to about 70 parts by weight, about 3 parts by weight to about 60 parts by weight, about 10 parts by weight to about 60 parts by weight, based on 100 parts by weight of the cathode.

It is also possible to introduce a pore into the cathode by introducing a pore forming agent during the production of the cathode. The cathode may have a form of a porous pellet, a porous sheet, or the like, but the form thereof is not limited thereto, and may be formed according to a desired battery form.

The cathode is permeable to gas such as oxygen or air. Therefore, this cathode may be different from a cathode that is substantially impermeable to gas such as oxygen or air and conducts only ions. Since the cathode is porous and/or permeable to gas, oxygen, air, or the like easily diffuses into the cathode, and lithium ions and/or electrons easily move through the solid electrolyte included in the cathode, so that an electrochemical reaction by oxygen, lithium ions and electrons easily proceeds in the cathode.

In the manufacture of the cathode, in addition to the solid electrolyte, a conductive material may be further added to further increase electron conductivity and ion conductivity. The conductive material may be porous. The conductive material has suitable porosity, thereby facilitating the penetration of air. The conductive material may be any suitable material that is porous and/or conductive, and is, for example, a carbon-based material having porosity. Examples of a carbon-based material may include, but are limited to, carbon black, graphite, graphene, active carbon, or carbon fiber. Any suitable carbon-based material may be used. The conductive material is, for example, a metallic material. Examples of the metallic material may include metal fiber, metal mesh, or metal powder. Examples of the metal powder may include copper powder, silver powder, and aluminum powder. The conductive material is, for example, an organic conductive material. Examples of the organic conductive material may include a polyphenylene derivative or polythiophene derivatives. The conductive materials are used alone or in combination. The cathode may include a composite conductor as the conductive material, and the cathode may further include the conductive material in addition to the composite conductor.

The cathode may further include a catalyst for oxidation/reduction of oxygen. Examples of the catalyst may include, but are not limited to, a precious metal catalyst such as platinum, gold, silver, palladium, ruthenium, rhodium, or osmium; an oxide catalyst such as manganese oxide, iron oxide, cobalt oxide, or nickel oxide; an organometallic catalyst such as cobalt phthalocyanine, or a combination thereof. Any suitable catalyst may be used.

The catalyst is supported on a carrier. Examples of the carrier may include an oxide carrier, a zeolite carrier, a clay-based mineral carrier, or a carbon carrier. The oxide carrier is a metal oxide carrier including Al, Si, Zr, Ti, Ce, Pr, Sm, Eu, Tb, Tm, Yb, Sb, Bi, V, Cr, Mn, Fe, Co, Ni, Cu, Nb, Mo, W, or a combination thereof. Examples of the oxide carrier may include alumina, silica, zirconium oxide, titanium dioxide, or a combination thereof. Examples of the carbon carrier may include, but are not limited to, a carbon black such as ketjen black, acetylene black, channel black, or lamp black; graphite such as natural graphite, artificial graphite, or expanded graphite; active carbon; or carbon fiber. Any suitable carbon carrier may be used.

The cathode may further include a binder. The binder may include a thermoplastic resin or a thermosetting resin. Examples of the binder may include, but are limited to, polyethylene, polypropylene, polytetrafluoroethylene (PTFE), polyvinylidene fluoride (PVDF), styrene-butadiene rubber, a tetrafluoroethylene-perfluoroalkylvinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoroethylene copolymer, an ethylene-acrylic acid copolymer, or a combination thereof. Any suitable binder may be used.

The cathode is manufactured by mixing a conductive material, an oxygen oxidation/reduction catalyst, and a binder to obtain a mixture by adding an appropriate solvent to the mixture to prepare a cathode slurry, and then applying the cathode slurry onto the surface of a substrate and drying the applied cathode slurry or pressing the cathode slurry onto the substrate to improve electrode density. The substrate is, for example, a cathode current collector, a separator, or a solid electrolyte film. The cathode current collector is, for example, a gas diffusion layer. The conductive material may include the solid electrolyte according to an embodiment, and the oxygen oxidation/reduction catalyst and the binder in the cathode may be omitted depending on the type of cathode required.

The lithium air battery may include an anode. According to an embodiment, the anode may include the solid electrolyte.

The anode may contain lithium.

The anode may be, for example, a lithium metal thin film or a lithium-based alloy thin film. The lithium-based alloy is, for example, an alloy of lithium with aluminum, tin, magnesium, indium, calcium, titanium, vanadium, or a combination thereof.

The lithium air battery may include an electrolyte disposed between the cathode and the anode.

The electrolyte may be, for example, the solid electrolyte including an oxide represented by Formulae 1 to 3.

According to an embodiment, the electrolyte may further include a solid electrolyte, a gel electrolyte, or a liquid electrolyte, in addition to the solid electrolyte. The additional solid electrolyte, the gel electrolyte and the liquid electrolyte are not particularly limited. Any suitable electrolyte may be used.

The additional solid electrolyte may include, but is not limited to, a solid electrolyte including an ion conductive inorganic material, a solid electrolyte including a polymeric ionic liquid (PIL) and a lithium salt, a solid electrolyte including an ionically conducting polymer and a lithium salt, or a solid electrolyte including an electron conductive polymer. Any suitable additional solid electrolyte may be used.

The ion conductive inorganic material may include, but is not limited to, a glass or amorphous metal ion conductor, a ceramic active metal ion conductor, or a glass ceramic active metal ion conductor. Any suitable ion conductive inorganic material may be used. The ion conductive inorganic material may be in the form of, for example, a particle or a sheet.

Examples of the ion conductive inorganic material may include $BaTiO_3$, $Pb(Zr_aTi_{1-a})O_3$ ($0 \le a \le 1$) (PZT), $pB_{1-x}La_xZr_{1-y}Ti_yO_3$ (PLZT) ($0 \le x < 1$, $0 \le y < 1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $Li_{1+x+y}(Al_aGa_{1-a})_x(Ti_b Ge_{1-b})_{2-x}Si_yP_{3-y}O_{12}$ ($0 \le x \le 1$, $0 \le y \le 1$, $0 \le a \le 1$ and $0 \le b \le 1$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$)-based glass, $P_2S_5$-based glass ($Li_xP_yS_z$, $0<x<3$, $0<y<3$, $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-based ceramics, garnet-based ceramics ($Li_{3+x}La_3M_2O_{12}$(M=Te, Nb, Zr, $0 \le x \le 5$)), or a combination thereof.

The polymeric ionic liquid (PIL) may include i) a cation that may be an ammonium-based ion, a pyrrolidinium-based ion, a pyridinium-based ion, a pyrimidinium-based ion, an imidazolium-based ion, a piperidinium-based ion, pyrazolium-based ion, an oxazolium-based ion, a pyridazinium-based ion, a phosphonium-based ion, a sulfonium-based ion, a triazolium-based ion, or a combination thereof, and ii) an anion that may be $BF_4^-$, $PF_6^-$, $AsF_6^-$, $SbF_6^-$, $AlCl_4^-$, $HSO_4^-$, $ClO_4^-$, $CH_3SO_3^-$, $CF_3SO_2^-$, $(CF_3SO_2)_2N^-$, $Cl^-$, $Br^-$, $I^-$, $SO_4^-$, $CF_3SO_3^-$, $(C_2F_5SO_2)_2N^-$, $(C_2F_6SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $O(CF_3)_2C_2(CF_3)_2O)_2PO^-$.

Examples of the polymeric ionic liquid (PIL) may include poly(diallyldimethylammonium)TFSI, poly(1-allyl-3-methylimidazolium bis(trifluoromethanesulfonyl)imide), poly (N-methyl-N-propylpiperidinium bis(trifluoromethanesulfonyl)imide), or a combination thereof.

The ion conductive polymer may include a conductive repeating unit that is derived from an ether-based monomer, an acrylic monomer, a methacrylic monomer, a siloxane-based monomer, or a combination thereof.

Examples of the ion conductive polymer may include, but are not limited to, polyethylene oxide (PEO), polyvinyl alcohol (PVA), polyvinylpyrrolidone (PVP), polyvinyl sulfone, polypropylene oxide (PPO), polymethyl methacrylate, polyethyl methacrylate, polydimethylsiloxane, polyacrylic acid, polymethacrylic acid, polymethylacrylate, polyethylacrylate, poly2-ethylhexyl acrylate, polybutyl methacrylate, poly2-ethylhexyl methacrylate, polydecyl acrylate, polyethylene vinyl acetate, phosphate ester polymer, polyester sulfide, polyvinylidene fluoride (PVdF), Li-substituted Nafion, or a combination thereof. Any suitable ion conductive polymer may be used.

Examples of the electron conductive polymer may include, but are not limited to, polyphenylene derivatives or polythiophene derivatives. Any suitable electron conductive polymer may be used.

The gel electrolyte is obtained by adding a low-molecular-weight solvent to the solid electrolyte disposed between the cathode and the anode. The gel electrolyte is obtained by adding a solvent, an oligomer, or a combination thereof, which is low-molecular-weight compound, to a polymer.

The liquid electrolyte may include a solvent and a lithium salt.

The solvent may include, but is not limited to, an organic solvent, an ionic liquid, an oligomer, or a combination thereof. Any suitable solvent may be used as long as it is a liquid at room temperature (25° C.).

The organic solvent may be an ether-based solvent, a carbonate-based solvent, an ester-based solvent, a ketone-based solvent, or a combination thereof. The organic solvent may include, but is not limited to, propylene carbonate, ethylene carbonate, fluoroethylene carbonate, vinyl ethylene carbonate butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, dimethylacetamide, dimethylsulfoxide, dioxane, 1,2-dime Methoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, MW~500), dimethyl ether, diethyl ether, dibutyl ether, dimethoxyethane, or a combination thereof. Any suitable organic solvent that is liquid at room temperature may be used.

The ionic liquid (IL) may include i) a cation that may be an ammonium-based ion, a pyrrolidinium-based ion, a pyridinium-based ion, a pyrimidinium-based ion, an imidazolium-based ion, a piperidinium-based ion, a pyrazolium-based ion, an oxazolium-based ion, a pyridazinium-based ion, a phosphonium-based ion, a sulfonium-based ion, a triazolium-based ion, or a combination thereof, and ii) an anion that may be $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br_4^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

The lithium salt may include, but is not limited to, LiTFSI, ($LiN(SO_2CF_3)_2$), $LiPF_6$, $LiBF_4$, $LiAsF_6$, $LiClO_4$, $LiNO_3$, (lithium bis(oxalato) borate (LiBOB), $LiCF_3SO_3$, $LiN(SO_2C_2F_5)_2$, $LiN(SO_2F)_2$, $LiC(SO_2CF_3)_3$, $LiN(SO_3CF_3)_2$, $LiC_4F_9SO_3$, $LiAlCl_4$, or a combination thereof. Any suitable lithium salt may be used. The concentration of the lithium salt is, for example, about 0.01 molar (M) to about 5.0 M, about 0.05 M to about 4 M, about 0.1 M to about 4.5 M, about 0.5 M to about 4 M, or about 1 M to about 3.5 M.

The lithium air battery may further include a separator between the cathode and the anode.

The separator is not limited as long as it has a composition capable of enduring the range of use of the lithium air battery. Examples of the separator may include a polymer non-woven fabric such as a polypropylene non-woven fabric or a polyphenylene sulfide non-woven fabric; a porous film of olefin resin such as polyethylene or polypropylene; a glass fiber; or a combination thereof.

The electrolyte may have a structure in which a separator is impregnated with a solid polymer electrolyte or a structure in which a separator is impregnated with a liquid electrolyte. The electrolyte having a structure in which a separator is impregnated with a solid polymer electrolyte is prepared by placing a solid polymer electrolyte film on one surface or both surfaces of the separator and roll-pressing the solid polymer electrolyte film. The electrolyte has a structure in which a separator is impregnated with a liquid electrolyte that is prepared by injecting a liquid electrolyte containing a lithium salt into the separator.

The lithium air battery may be completed by placing an anode on one surface in a case, placing an electrolyte layer on the anode, placing a cathode on the electrolyte layer, placing a porous cathode current collector on the cathode, placing a pushing member on the porous cathode current collector to transfer air to an air electrode, and pushing the pushing member to fix the cell. The case may be separated into an upper portion contacting the anode and a lower portion contacting the air electrode, and may be provided with an insulating resin between the upper portion and the lower portion to electrically insulate the cathode and the anode from each other.

The lithium air battery may be used in both primary and secondary batteries. The shape of the lithium air battery is not particularly limited, and is, for example, a coin shape, a button shape, a sheet shape, a laminate shape, a cylinder shape, a flat shape, or a horn shape. The lithium air battery may be a medium-sized or large-sized batteries for electric vehicles.

Figure 5:
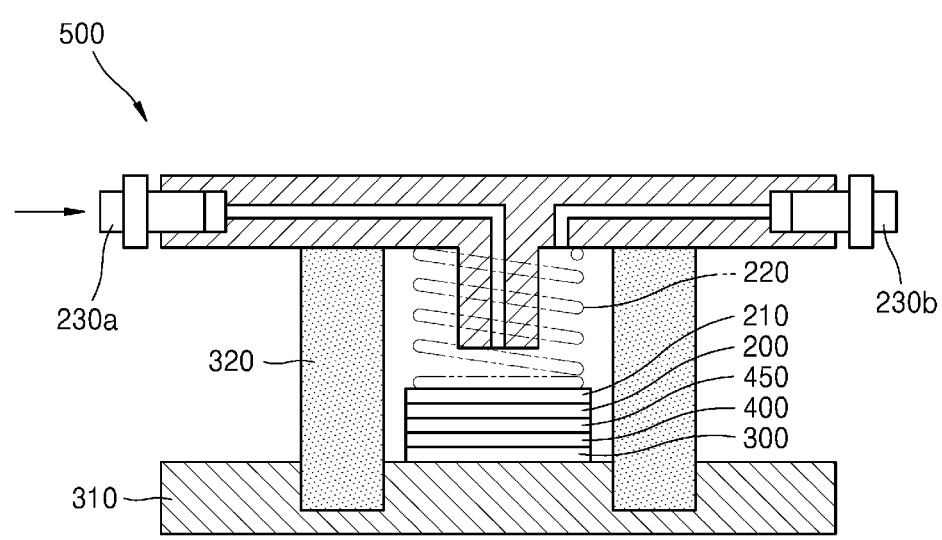
FIG. 5 is a schematic cross-sectional view illustrating an embodiment of a structure of a lithium air battery.

FIG. 5 is a schematic cross-sectional view illustrating a structure of a lithium air battery according to an embodiment.

Referring to FIG. 5, a lithium air battery 500 has a structure in which a first electrolyte 400 is interposed between a cathode 200 containing oxygen adjacent to a first current collector 210 and an anode 300 containing lithium adjacent to a second current collector 310. The first electrolyte 400 is a separator impregnated with a liquid electrolyte.

A second electrolyte 450 may be provided between the cathode 200 and the first electrolyte 400. According to an embodiment, the second electrolyte 450 is a lithium ion conductive solid electrolyte film, and may use the solid electrolyte according to the embodiment. The first current collector 210 is porous, and may also serve as a gas diffusion layer capable of diffusing air as porosity. A pushing member 220 capable of transferring air to the cathode 200 is disposed on the first current collector 210.

Air is supplied to an air inlet 230a and discharged to an air outlet 230b. The lithium air battery 500 may be accommodated in a stainless-steel container. A reference number 320 denotes an insulating resin case.

The "air" of the lithium air battery is not limited to atmospheric air, and may include a combination of gases containing oxygen, or pure oxygen gas. This broad definition of the term "air" applies to all applications, for example air cells, air cathodes and the like.

Hereinafter, the present disclosure will be described in detail with reference to Examples and Comparative Examples. However, these Examples are provided only for illustrative purposes, and the scope of the present disclosure is not limited thereto.

EXAMPLES

Preparation of Solid Electrolyte Including an Oxide

Comparative Example 1: $Li_2HfO_3$ $Li_2CO_3$, which is a lithium precursor, and $HfO_2$, which is a M1 precursor, were mixed according to the composition ratio of $Li_2HfO_3$, and ethanol was added thereto and mixed to obtain a precursor mixture. The precursor mixture was put into a ball-milling apparatus, and was pulverized and mixed for 4 hours. The resulting mixture was dried, heated to 650° C. at a temperature increase rate of about 5° C./min, and the primarily heat-treated for 12 hours under an air atmosphere to obtain powder.

The powder obtained by primary heat-treatment was ground, and then pressed at about 100 MPa to prepare a pellet having a diameter of about 1 cm and a height of about 0.1 cm. Secondary heat-treatment of the pellet was carried out at 700° C. for 12 hours under an air or oxygen atmosphere to obtain a solid electrolyte including an oxide. When heated to 700° C. during the secondary heat-treatment, the temperature increase rate was about 5° C./min.

Example 1

A solid electrolyte including an oxide was obtained in the same manner as in Comparative Example 1, except that, when preparing the precursor mixture, lithium chloride was further added. The content of $Li_2CO_3$, which is a lithium precursor, $HfO_2$, which is a M1 precursor, and lithium chloride were stoichiometrically selected so as to obtain $Li_{1.5}HfCl_{0.5}O_{2.5}$. Primary heat-treatment was carried out at 650° C. for 12 hours, and secondary heat-treatment was carried out at 700° C. for 12 hours.

Example 2 and Example 6

Solid electrolytes were obtained in the same manner as in Example 1, except that the content of $Li_2CO_3$, which is a lithium precursor, HfO$_2$, which is a M1 precursor, and lithium chloride were selected so as to obtain target materials given in Table 1.

Example 3, Example 9 and Example 10

Solid electrolytes were obtained in the same manner as in Comparative Example 1, except that, when preparing the precursor mixture, lithium fluoride (LiF) was further added, and the content of Li$_2$CO$_3$, which is a lithium precursor, HfO$_2$, which is a M1 precursor, and lithium fluoride was stoichiometrically selected so as to obtain target materials having the composition of Table 1.

Example 4

A solid electrolyte was obtained in the same manner as in Comparative Example 1, except that, when preparing the precursor mixture, the content of Li$_2$CO$_3$, which is a lithium precursor, and HfO$_2$, which is a M1 precursor, were stoichiometrically selected so as to obtain a target material.

Example 5

A solid electrolyte was obtained in the same manner as in Comparative Example 1, except that, when preparing the precursor mixture, Al$_2$O$_3$, which is an Al precursor, was further added, and the content of Li$_2$CO$_3$, which is a lithium precursor, HfO$_2$, which is a M1 precursor, and Al$_2$O$_3$ was stoichiometrically controlled so as to obtain a target material having the composition of Table 1.

Example 7

A solid electrolyte was obtained in the same manner as in Comparative Example 1, except that, when preparing the precursor mixture, magnesium oxide (MgO), which is a Mg precursor, was further added, and the content of Li$_2$CO$_3$, which is a lithium precursor, HfO$_2$, which is a M1 precursor, and magnesium oxide (MgO) were stoichiometrically selected so as to obtain a target material having the composition of Table 1.

Example 8

A solid electrolyte was obtained in the same manner as in Comparative Example 1, except that, when preparing the precursor mixture, tantalum oxide (Ta$_2$O$_5$), which is a Ta precursor, was further added, and the content of Li$_2$CO$_3$, which is a lithium precursor, HfO$_2$, which is a M1 precursor, and tantalum oxide (Ta$_2$O$_5$) was stoichiometrically selected so as to obtain a target material having the composition of Table 1.

Example 11 A solid electrolytes was obtained in the same manner as in Comparative Example 1, except that, when preparing the precursor mixture, yttrium oxide (Y$_2$O$_3$), which is a Y precursor, was further added, and the content of Li$_2$CO$_3$, which is a lithium precursor, HfO$_2$, which is a M1 precursor, and yttrium oxide (Y$_2$O$_3$) was stoichiometrically selected so as to obtain a target material having the composition of Table 1.

Example 12

Solid electrolytes were obtained in the same manner as in Comparative Example 1, except that, when preparing the precursor mixture, zinc oxide (Zn$_2$O$_3$), which is a Zn precursor, was further added, and the content of Li$_2$CO$_3$, which is a lithium precursor, HfO$_2$, which is a M1 precursor, and zinc oxide (Zn$_2$O$_3$) was stoichiometrically selected so as to obtain a target material having the composition of Table 1.

TABLE 1

| Example | Composition |
| --- | --- |
| Comparative Example 1 | Li$_2$HfO$_3$ |
| Example 1 | Li$_{1.5}$HfCl$_{0.5}$O$_{2.5}$ |
| Example 2 | Li$_{1.8}$HfCl$_{0.2}$O$_{2.8}$ |
| Example 3 | Li$_{1.5}$HfF$_{0.5}$O$_{2.5}$ |
| Example 4 | Li$_{2.2}$Hf$_{0.95}$O$_3$ |
| Example 5 | Li$_{2.2}$Hf$_{0.8}$Al$_{0.2}$O$_3$ |
| Example 6 | Li$_{1.9}$HfCl$_{0.1}$O$_3$ |
| Example 7 | Li$_{2.2}$Hf$_{0.9}$Mg$_{0.1}$O$_3$ |
| Example 8 | Li$_{1.8}$Hf$_{0.8}$Ta$_{0.2}$O$_3$ |
| Example 9 | Li$_{1.9}$HfF$_{0.1}$O$_{2.9}$ |
| Example 10 | Li$_{1.8}$HfF$_{0.2}$O$_{2.8}$ |
| Example 11 | Li$_{2.2}$Hf$_{0.8}$Y$_{0.2}$O$_3$ |
| Example 12 | Li$_{2.2}$Hf$_{0.9}$Zn$_{0.1}$O$_3$ |

Comparative Example 2: Li$_2$ZrO$_3$

Li$_2$CO$_3$, which is a lithium precursor, and ZrO$_2$, which is a M1 precursor, were mixed according to the composition ratio of Li$_2$ZrO$_3$, and ethanol was added thereto and mixed to obtain a precursor mixture. The precursor mixture was put into a ball-milling apparatus, and was pulverized and mixed for 4 hours. The resulting mixture was dried, heated to 650° C. at a temperature increase rate of about 5° C./min, and then primarily heat-treated for 12 hours under an air atmosphere to obtain powder.

The powder obtained by the primary heat-treatment was ground, and then pressed at about 100 MPa to prepare a pellet having a diameter of about 1 cm and a height of about 0.1 cm. Secondary heat-treatment of the pellet was carried out at 700° C. for 12 hours under an air or oxygen atmosphere to obtain a solid electrolyte. When heating to 700° C. during the secondary heat-treatment, the temperature increase rate was about 5° C./min.

Example 13

A solid electrolyte was obtained in the same manner as in Comparative Example 2, except that, when preparing the precursor mixture, aluminum oxide (Al$_2$O$_3$), which is a Al precursor, was further added, and the content of Li$_2$CO$_3$, which is a lithium precursor, ZrO$_2$, which is a M1 precursor, and aluminum oxide (Al$_2$O$_3$) was stoichiometrically selected so as to obtain a target material having the composition of Table 2.

Example 14 and Example 16

Solid electrolytes were obtained in the same manner as in Comparative Example 2, except that, when preparing the precursor mixture, lithium chloride (LiCl) was further added, and the content of Li$_2$CO$_3$, which is a lithium precursor, ZrO$_2$, which is a M1 precursor, and lithium chloride (LiCl) was stoichiometrically selected so as to obtain a target material having the composition of Table 2.

Example 15

A solid electrolyte was obtained in the same manner as in Comparative Example 2, except that, when preparing the precursor mixture, yttrium oxide (Y$_2$O$_3$), which is a Y precursor, was further added, and the content of Li$_2$CO$_3$, which is a lithium precursor, $ZrO_2$, which is a M1 precursor, and yttrium oxide ($Y_2O_3$) was stoichiometrically selected so as to obtain a target material having the composition of Table 2.

Example 17

A solid electrolyte was obtained in the same manner as in Comparative Example 2, except that, when preparing the precursor mixture, magnesium oxide ($Y_2O_3$), which is a Mg precursor, was further added, and the content of $Li_2CO_3$, which is a lithium precursor, $ZrO_2$, which is a M1 precursor, and magnesium oxide (MgO) was stoichiometrically selected so as to obtain a target material having the composition of Table 2.

Example 18

A solid electrolyte was obtained in the same manner as in Comparative Example 2, except that, when preparing the precursor mixture, zinc oxide (ZnO), which is a Zn precursor, was further added, and the content of $Li_2CO_3$, which is a lithium precursor, $ZrO_2$, which is a M1 precursor, and zinc oxide (ZnO) was stoichiometrically selected so as to obtain a target material having the composition of Table 2.

Example 19

A solid electrolyte was obtained in the same manner as in Comparative Example 2, except that, when preparing the precursor mixture, tantalum oxide ($Ta_2O_5$), which is a Ta precursor, was further added, and the content of $Li_2CO_3$, which is a lithium precursor, $ZrO_2$, which is a M1 precursor, and tantalum oxide ($Ta_2O_5$) was stoichiometrically selected so as to obtain a target material having the composition of Table 2.

Example 20

A solid electrolyte was obtained in the same manner as in Comparative Example 2, except that the content of $Li_2CO_3$, which is a lithium precursor, and $ZrO_2$, which is a M1 precursor, was selected to obtain a composition ratio of $Li_{2.2}Zr_{0.95}O_3$.

Examples 21 to 23

Solid electrolytes were obtained in the same manner as in Comparative Example 2, except that, when preparing the precursor mixture, lithium fluoride (LiF) was further added, and the content of $Li_2CO_3$, which is a lithium precursor, $ZrO_2$, which is a M1 precursor, and lithium fluoride (LiF) was stoichiometrically selected so as to obtain a target material having the composition of Table 2.

TABLE 2

| Example | Composition |
| --- | --- |
| Comparative Example 2 | $Li_2ZrO_3$ |
| Example 13 | $Li_{2.2}Zr_{0.8}Al_{0.2}O_3$ |
| Example 14 | $Li_{1.8}ZrCl_{0.2}O_{2.8}$ |
| Example 15 | $Li_{2.2}Zr_{0.8}Y_{0.2}O_3$ |
| Example 16 | $Li_{1.9}ZrCl_{0.1}O_{2.9}$ |
| Example 17 | $Li_{2.2}Zr_{0.9}Mg_{0.1}O_3$ |
| Example 18 | $Li_{2.2}Zr_{0.9}Zn_{0.1}O_3$ |
| Example 19 | $Li_{1.8}Zr_{0.8}Ta_{0.2}O_3$ |
| Example 20 | $Li_{2.2}Zr_{0.95}O_3$ |
| Example 21 | $Li_{1.5}ZrF_{0.5}O_{2.5}$ |
| Example 22 | $Li_{1.8}ZrF_{0.2}O_{2.8}$ |
| Example 23 | $Li_{1.9}ZrF_{0.1}O_{2.9}$ |

The solid electrolyte of Example 4 contains an oxide containing cationic vacancy, and each of the solid electrolytes of Examples 3, 9 and 10 contains an oxide doped with a fluoride anion. Each of the solid electrolytes of Examples 1, 2, and 6 contains an oxide doped with a chloride anion, and the solid electrolytes of Examples 5 and 11 contains an oxide doped with a trivalent cation.

The solid electrolyte of Example 8 contains an oxide doped with a pentavalent cation, and the solid electrolyte of Example 7 contains an oxide doped with a divalent cation. The solid electrolyte of Example 12 contains an oxide doped with a divalent cation.

Manufacture Example 1: Manufacture of Lithium Air Battery (Cathode/Solid Electrolyte/PEO/Li Anode)

parts by weight of carbon (Super-P), 10 parts by weight of polytetrafluoroethylene (PTFE), and 50 parts by weight of NMP (N-methylpyrrolidone) were mixed to prepare a cathode slurry, and then the cathode slurry was applied and roll-pressed to obtain a cathode composite sheet. The cathode composite sheet was pressed onto a stainless mesh, and then vacuum-dried in an oven at 100° C. for 120 minutes to obtain a cathode.

The center of a 5 cm×5 cm aluminum film (polypropylene coated aluminum film, thickness 200 μm) was perforated to have a hole and the hole was clogged with the solid electrolyte of Example 1 using an adhesive to prepare a first aluminum film provided with the solid electrolyte of Example 1. Next, a new second aluminum film having a size of 5 cm×5 cm, a copper current collector (thickness 20 μm), a lithium foil (1.4 cm×1.4 cm, thickness 100 μm), a separator (Celgard-3501, manufactured by Celgard Corporation) having a thickness of 25 μm and made of a polypropylene material impregnated with an electrolyte solution of a mixture of 1 molar (M) LiTFSI and PC, and the prepared first aluminum film were laminated, heated in vacuum, and adhered to obtain an aluminum pouch typed protected lithium anode.

The protected lithium anode was provided in a stainless steel case, and the cathode provided with the separator (Celgard-3501, manufactured by Celgard Corporation) having a thickness of 25 μm and made of a polypropylene material was set to face the anode. Subsequently, a porous gas diffusion layer made of carbon fiber was placed on the cathode, a foamed nickel plate was placed on the porous gas diffusion layer, and a pushing member for transferring air to the cathode was pressed onto the foamed nickel plate to manufacture a lithium air battery.

Manufacture Examples 2 to 23: Manufacture of Lithium Air Batteries

Lithium air batteries were manufactured in the same manner as in Manufacture Example 1, except that each of the solid electrolytes of Examples 2 to 23 was used instead of the solid electrolyte of Example 1.

Comparative Manufacture Examples 1 and 2: Manufacture of Lithium Air Battery

Lithium air batteries were manufacture in the same manner as in Manufacture Example 1, except that each of the solid electrolytes of Comparative Examples 1 and 2 was used instead of the solid electrolyte of Example 1.

Evaluation Example 1: XRD Spectrum

XRD spectra of the solid electrolytes of Examples 3 to 5, 7, 9, 12, 13, and 20 and Comparative Example 1 were measured, and the results thereof are shown in FIG. 1. X-ray diffraction analysis was carried out using D8 Advance of Bruker Corporation, and Cu Kα radiation was used for XRD spectrum measurement.

As shown in FIG. 1, in the solid electrolytes of Examples 3 to 5, 7, 9, 12, 13, and 20, peaks appear in an area where the diffraction angle 2θ is 26.7±0.5 °2θ, 35±0.5 °2θ, and 39±0.5 °2θ, but, in the solid electrolyte of Comparative Example 1, these peaks were not observed.

Evaluation Example 2: Ion Conductivity

The upper end surface and lower end surface of each of the ion conductor pellets prepared Examples 1 to 12 and Comparative Example 1 were coated (deposited) with gold (Au) by sputtering, and impedances of the samples were measured by a 2-probe method using an impedance analyzer. The frequency range was 1 Hz to 1 MHz, and the amplitude voltage was 100 mV. The impedances of the samples were measured at 30° C. under an air atmosphere. Resistance values were obtained from the arc of the Nyquist plot for the impedance measurement results, and ion conductivity was calculated from the resistance values.

Figure 3:
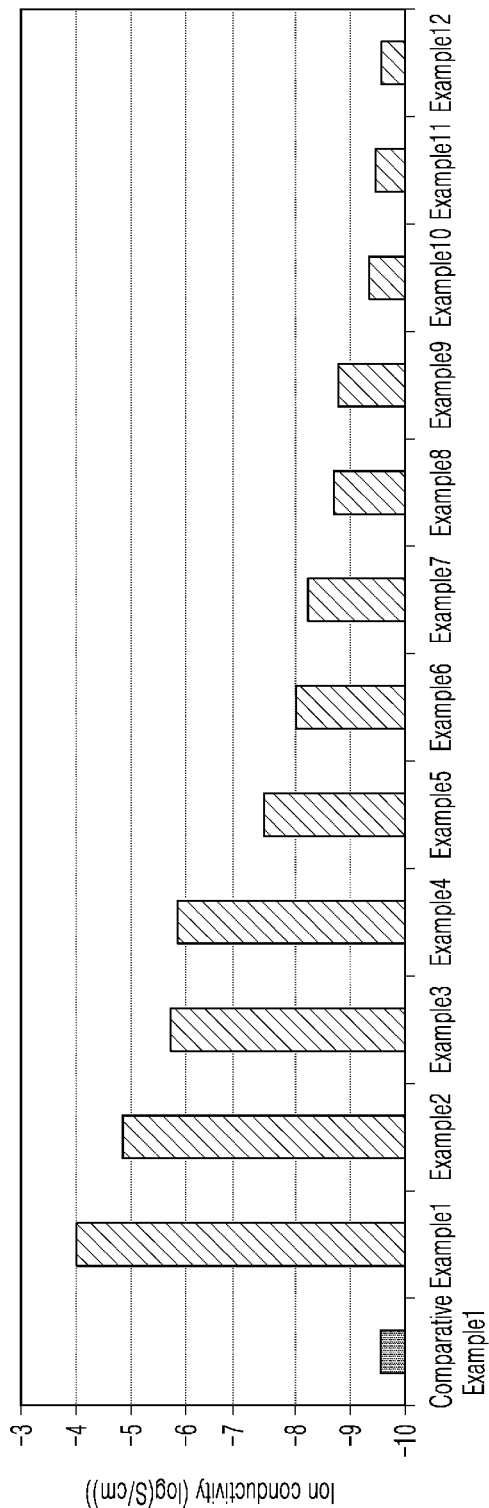
FIG. 3 is a graph of ion conductivity (log Siemens per centimeter (log(S/cm))) illustrating ion conductivity of solid electrolytes of Examples 1 to 12 and Comparative Example 1.

As shown in FIG. 3, the solid electrolytes of Examples 1 to 12 exhibited higher ionic conductivity than the solid electrolyte of Comparative Example 1. From these results, it was confirmed that the ion conductivity of the solid electrolyte was improved by introducing anions such as fluorine and chlorine, and by introducing yttrium, aluminum, tantalum, magnesium, or zinc.

Each of the solid electrolytes of Examples 11 and 12 contains yttrium and zinc in addition to hafnium, and thus the weight thereof is reduced as compared with the weight of the electrolyte of Comparative Example 1, thereby making it possible to manufacture a lightweight lithium air battery.

Evaluation Example 3: Ion Conductivity

The upper end surface and lower end surface of the ion conductor pellets prepared in Examples 13 to 23 and Comparative Example 2 were coated (deposited) with gold (Au) by sputtering, and impedances of the samples were measured by 2-probe method using an impedance analyzer. The frequency range was about 1 Hz to about 1 MHz, and the amplitude voltage was 100 mV. The impedances of the samples were measured at 30° C. in air atmosphere. Resistance values were obtained from the arc of the Nyquist plot for the impedance measurement results, and ion conductivity was calculated from the resistance values.

Figure 4:
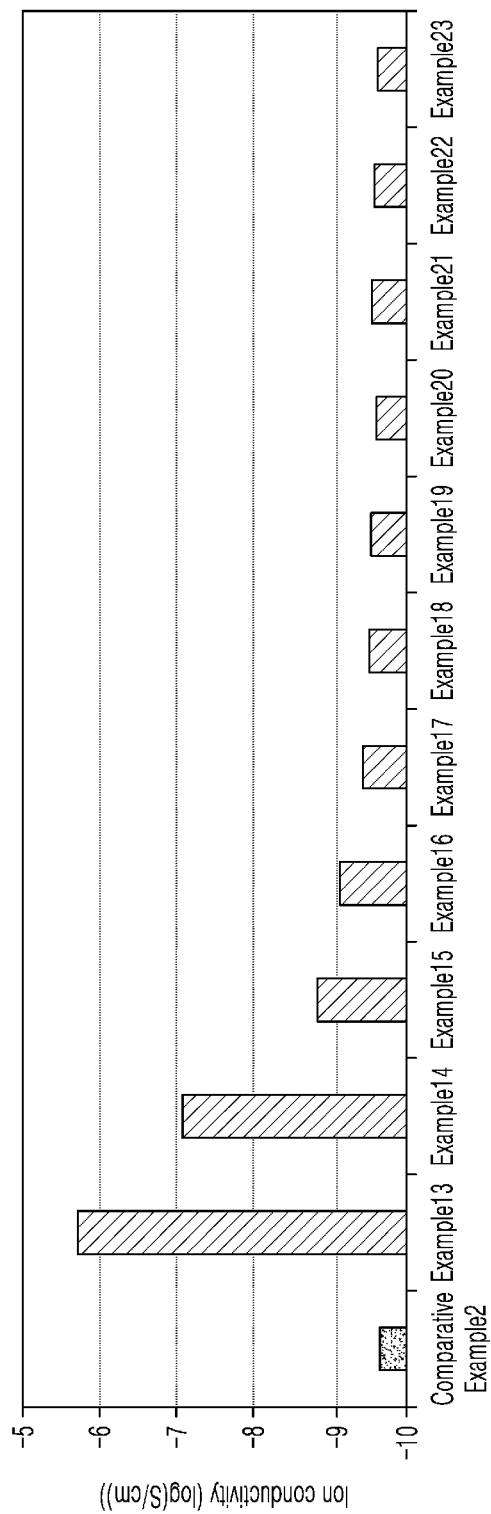
FIG. 4 is a graph of ion conductivity (log Siemens per centimeter (log(S/cm))) illustrating ion conductivity of solid electrolytes of Examples 13 to 23 and Comparative Example 2.

As shown in FIG. 4, the solid electrolytes of Examples 13 to 23 exhibited the same or improved ion conductivity as compared with the solid electrolyte of Comparative Example 2. From these results, it was confirmed that the ion conductivity of the solid electrolyte was improved by introducing anions such as fluorine and chlorine, and by introducing yttrium, aluminum, tantalum, magnesium, or zinc. In particular, the solid electrolytes of Examples 20 to 23 exhibited the same level of ionic conductivity as compared with the solid electrolyte of Comparative Example 2, and the pellet density was increased as shown in Table 4 below. As such, when the solid electrolyte having increased pellet density is used, the resulting product obtained after the pressing process for preparing the solid electrolyte is dense. Thus, when a solid electrolyte was prepared in the form of a film using the dense product, the solid electrolyte had improved physical properties because water or air did not pass through the solid electrolyte.

Evaluation Example 4: Pellet Density

Examples 1 to 12 and Comparative Example 1

The pellet density of ion conductor pellets was measured by measuring the diameter, height, and weight of the ion conductor pellets obtained in Examples 1 to 12 and Comparative Example 1. The evaluation results of the pellet density were shown in Table 3 and FIG. 2.

TABLE 3

| Example | Pellet density (g/cc) |
| --- | --- |
| Example 1 | 4.42 |
| Example 2 | 4.31 |
| Example 3 | 4.60 |
| Example 4 | 4.00 |
| Example 5 | 4.99 |
| Example 6 | 4.24 |
| Example 7 | 5.10 |
| Example 8 | 4.37 |
| Example 9 | 4.42 |
| Example 10 | 4.41 |
| Example 11 | 4.96 |
| Example 12 | 4.92 |
| Comparative Example 1 | 3.97 |

Figure 2:
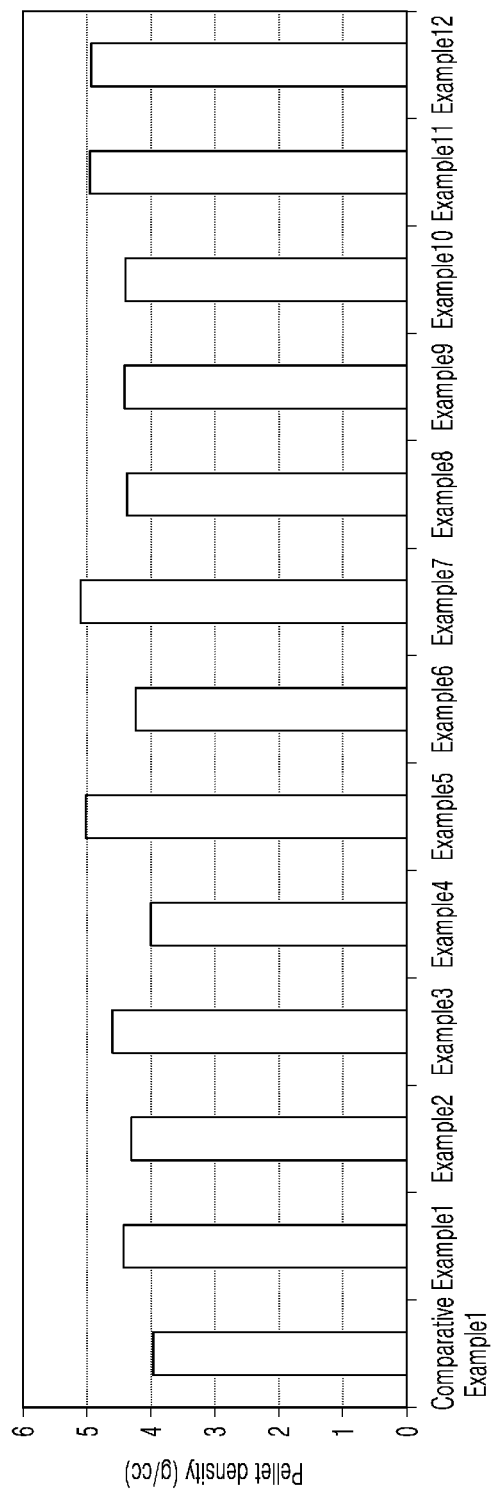
FIG. 2 is a graph of pellet density (grams per cubic centimeters (g/cc)) Illustrating pellet density of solid electrolytes of Examples 1 to 12 and Comparative Example 1.

As shown in Table 3 and FIG. 2, it may be found that the pellet density of the pellets of Examples 1 to 12 was improved as compared with the pellet density of the pellet of Comparative Example 1.

Examples 13 to 23 and Comparative Example 2

The pellet density of ion conductor pellets was measured by measuring the diameter, height, and weight of the ion conductor pellets obtained in Examples 13 to 23 and Comparative Example 2.

The evaluation results of the pellet density were shown in Table 4.

TABLE 4

| Example | Pellet density (g/cc) |
| --- | --- |
| Example 13 | 3.42 |
| Example 14 | 2.60 |
| Example 15 | 2.94 |
| Example 16 | 2.79 |
| Example 17 | 2.85 |
| Example 18 | 3.33 |
| Example 19 | 3.18 |
| Example 20 | 3.04 |
| Example 21 | 3.09 |
| Example 22 | 2.99 |
| Example 23 | 2.87 |
| Comparative Example 2 | 2.62 |

As seen from Table 4, it may be found that the pellet density of the ion conductor pellets of Examples 13 and 15 to 23 is improved as compared with the pellet density of the pellets of Comparative Example 2. Although the pellet density of the ion conductor pellets of Example 14 was lower than that of Comparative Example 2, the conductivity was greatly increased as shown in FIG. 4.

Evaluation Example 5: Evaluation of Electrochemical Stability

After the solid electrolyte of Example 1 was pulverized to a size of about 1 μm, N-methyl-2-pyrrolidone was mixed with 85 weight percent (wt %) of the pulverized product, 10 wt % of carbon black as a conductive material, and 5 wt % of polyvinylidene fluoride (PVDF) as a binder to prepare a slurry. The slurry was applied on an aluminum foil and then dried to prepare a working electrode. A lithium metal foil was used as a counter electrode, and a separator impregnated with a liquid electrolyte (1 M LiTFSI in propylene carbonate (PC)) was disposed between the working electrode and the counter electrode to prepare a half-cell.

Electrochemical Stability of layered compounds on lithium metals was evaluated over a voltage range of 2 volts (V) to 4 V (vs. Li) at a scan rate of 0.1 millivolt per second (mV/sec) by cyclic voltammetry.

As a result of evaluation, the solid electrolyte of Example 1 was electrochemically stable without overcurrent due to side reactions during 1, 80, or 100 scans.

Evaluation Example 6: Evaluation of Charge and Discharge Characteristics of Lithium Air Battery The lithium air battery manufactured in Manufacture Example 1 was discharged up to 2.0 volts (V) (vs. Li) with a constant current of 0.01 milliampere per square centimeter (mA/cm$^2$) under an oxygen atmosphere of 60° C. and 1 atmosphere (atm), and then charged up to 4.25 V with the same current. This charge and discharge cycle was repeatedly performed. The charge and discharge test results of each lithium air battery in the first cycle were examined.

As a result of the charge and discharge test, it was confirmed that the lithium air battery of Manufacture Example 1, employing the solid electrolyte of Example 1, was stably driven.

Charge and discharge characteristics of the lithium air batteries of Manufacture Examples 2 to 23 were evaluated in the same manner as the lithium air battery of Manufacture Example 1.

From the evaluation results, it may be found that the lithium air batteries of Manufacture Examples 2 to 23 are operated stably like the lithium air battery of Manufacture Example 1.

According to an embodiment, the solid electrolyte has improved ion conductivity at room temperature, is stable against moisture in humid or atmospheric conditions, has improved stability in the presence of lithium, maintains excellent ion conductivity, and has high pellet density. When such a solid electrolyte is used, an electrochemical device with suppressed degradation may be manufactured when the solid electrolyte is used.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. A solid electrolyte comprising:
an oxide represented by Formula 1, Formula 2, Formula 3, or a combination thereof, $$Li_{2+4x}M1_{1-x}O_3 \quad \text{Formula 1}$$

wherein, in Formula 1, M1 is hafnium, titanium, zirconium, or a combination thereof, and 0<x<1;

$$Li_{2-y(a-4)}M1_{1-y}M2^a{}_yO_3 \quad \text{Formula 2}$$

wherein, in Formula 2,
M1 is hafnium, titanium, zirconium, or a combination thereof,
M2 is at least one element having an oxidation number of a, and
wherein a is an integer from 1 to 6, and 0<y<1; or $$Li_{2-z}M1O_{3-z}X_z \quad \text{Formula 3}$$

wherein, in Formula 3,
M1 is hafnium, titanium, zirconium, or a combination thereof,
X is a halogen, a pseudohalogen, or a combination thereof, and 0<z<2.

2. The solid electrolyte of claim 1, wherein, in Formulas 1 to 3, each M1 is independently hafnium, titanium, zirconium, or a combination thereof.

3. The solid electrolyte of claim 1, wherein, in Formula 2, M2 is aluminum, gallium, indium, niobium, tantalum, vanadium, yttrium, lanthanum, scandium, magnesium, calcium, strontium, barium, zinc, cadmium, tungsten, molybdenum, a vacancy, or a combination thereof.

4. The solid electrolyte of claim 1, wherein, in Formula 3, X is fluorine, chlorine, bromine, cyanide, cyanate, thiocyanate, azide, or a combination thereof.

5. The solid electrolyte of claim 1, wherein, in Formula 1, x is about 0.01 to about 0.9.

6. The solid electrolyte of claim 1, wherein, in Formula 2, y is about 0.05 to about 0.9.

7. The solid electrolyte of claim 1, wherein, in Formula 2, a is 2, 3, 5, or 6.

8. The solid electrolyte of claim 1, wherein, in Formula 3, z is about 0.05 to about 1.

9. The solid electrolyte of claim 1, wherein the oxide of Formula 1 is an oxide represented by Formula 4, an oxide represented by Formula 5, or a combination thereof:

$$Li_{2+4x}Hf_{1-x}O_3 \quad \text{Formula 4}$$

wherein, in Formula 4, 0.01≤x≤0.9, or $$Li_{2+4x}Zr_{1-x}O_3 \quad \text{Formula 5}$$

wherein, in Formula 5, 0.01≤x≤0.9.

10. The solid electrolyte of claim 1, wherein the oxide of Formula 2 is an oxide represented by Formula 6, an oxide represented by Formula 7, or a combination thereof:

$$Li_{2-y(a-4)}Hf_{1-y}M2^a{}_yO_3 \quad \text{Formula 6}$$

wherein, in Formula 6,
M2 is aluminum, gallium, indium, niobium, tantalum, vanadium, yttrium, lanthanum, scandium, magnesium, calcium, strontium, barium, zinc, cadmium, tungsten, molybdenum, or a combination thereof, a is an integer from 1 to 6, and 0.05≤y≤0.9, or $$Li_{2-y(a-4)}Zr_{1-y}M2^a{}_yO_3 \quad \text{Formula 7}$$

wherein, in Formula 7,
M2 is aluminum, gallium, indium, niobium, tantalum, vanadium, yttrium, lanthanum, scandium, magnesium, calcium, strontium, barium, zinc, cadmium, tungsten, molybdenum, or a combination thereof,
a is an integer from 1 to 6, and 0.05≤y≤0.9.

11. The solid electrolyte of claim 1, wherein the oxide of Formula 3 is an oxide represented by Formula 8, an oxide represented by Formula 9, or a combination thereof:

$$Li_{2-z}HfO_{3-z}X_z \quad \text{Formula 8}$$

wherein, in Formula 8, X is a halogen, a pseudohalogen, or a combination thereof, and 0.05≤z≤1, or $$Li_{2-z}ZrO_{3-z}X_z$$

wherein, in Formula 9, X is a halogen, a pseudohalogen, or a combination thereof, and 0.05≤z≤1.

12. The solid electrolyte of claim 1, wherein the oxide has a rock salt crystal structure.

13. The solid electrolyte of claim 1, wherein the oxide has a C2/c space group.

14. The solid electrolyte of claim 1, wherein the oxide is $Li_{2.2}Hf_{0.95}O_3$, $Li_{1.9}HfF_{0.1}O_{2.9}$, $Li_{1.8}HfF_{0.2}O_{2.8}$, $Li_{1.5}HfF_{0.5}O_{2.5}$, $Li_{1.9}HfCl_{0.1}O_{2.9}$, $Li_{1.8}HfCl_{0.2}O_{2.8}$, $Li_{1.5}HfCl_{0.5}O_{2.5}$, $Li_{1.9}HfF_{0.05}Cl_{0.05}O_{2.9}$, $Li_{1.8}HfF_{0.1}Cl_{0.2}O_{2.8}$, $Li_{1.8}HfBr_{0.1}Cl_{0.1}O_{2.8}$, $Li_{1.5}HfF_{0.25}Cl_{0.25}O_{2.5}$, $Li_{1.5}HfBr_{0.25}Cl_{0.25}O_{2.5}$, $Li_{2.2}Hf_{0.8}Y_{0.2}O_3$, $Li_{2.2}Hf_{0.8}La_{0.2}O_3$, $Li_{2.2}Hf_{0.8}Sc_{0.2}O_3$, $Li_{2.2}Hf_{0.8}Al_{0.2}O_3$, $Li_{1.8}Hf_{0.8}Ta_{0.2}O_3$, $Li_{1.8}Hf_{0.8}Nb_{0.2}O_3$, $Li_{1.8}Hf_{0.8}V_{0.2}O_3$, $Li_{2.2}Hf_{0.9}Mg_{0.1}O_3$, $Li_{2.2}Hf_{0.9}Ca_{0.1}O_3$, $Li_{2.2}Hf_{0.9}Sr_{0.1}O_3$, $Li_{2.2}Hf_{0.9}Ba_{0.1}O_3$, $Li_{2.2}Hf_{0.9}Zn_{0.1}O_3$, $Li_{2.2}Hf_{0.9}Cd_{0.1}O_3$, $Li_{2.2}Zr_{0.95}O_3$, $Li_{1.9}ZrF_{0.1}O_{2.9}$, $Li_{1.8}ZrF_{0.2}O_{2.8}$, $Li_{1.5}ZrF_{0.5}O_{2.5}$, $Li_{1.9}ZrCl_{0.1}O_{2.9}$, $Li_{1.8}ZrCl_{0.2}O_{2.8}$, $Li_{1.5}ZrCl_{0.5}O_{2.5}$, $Li_{1.9}ZrF_{0.05}Cl_{0.05}O_{2.9}$, $Li_{1.9}ZrBr_{0.05}Cl_{0.05}O_{2.9}$, $Li_{1.8}ZrF_{0.1}Cl_{0.1}O_{2.8}$, $Li_{1.8}ZrBr_{0.1}Cl_{0.1}O_{2.8}$, $Li_{1.5}ZrF_{0.25}Cl_{0.25}O_{2.5}$, $Li_{1.5}ZrBr_{0.25}Cl_{0.25}O_{2.5}$, $Li_{2.2}Zr_{0.8}Y_{0.2}O_3$, $Li_{2.2}Zr_{0.8}La_{0.2}O_3$, $Li_{2.2}Zr_{0.8}Sc_{0.2}O_3$, $Li_{2.2}Zr_{0.8}Al_{0.2}O_3$, $Li_{1.8}Zr_{0.8}Ta_{0.2}O_3$, $Li_{1.8}Zr_{0.8}Nb_{0.2}O_3$, $Li_{1.8}Zr_{0.8}V_{0.2}O_3$, $Li_{2.2}Zr_{0.9}Mg_{0.1}O_3$, $Li_{2.2}Zr_{0.9}Ca_{0.1}O_3$, $Li_{2.2}Zr_{0.9}Sr_{0.1}O_3$, $Li_{2.2}Zr_{0.9}Ba_{0.1}O_3$, $Li_{2.2}Zr_{0.9}Zn_{0.1}O_3$, $Li_{2.2}Zr_{0.9}Cd_{0.1}O_3$, $Li_{2.2}Hf_{0.8}Ta_{0.2}O_3$, $Li_{2.2}Hf_{0.8}Nb_{0.2}O_3$, $Li_{2.2}Hf_{0.8}V_{0.2}O_3$, $Li_{2.2}Zr_{0.8}Ta_{0.2}O_3$, $Li_{2.2}Zr_{0.8}Nb_{0.2}O_3$, $Li_{2.2}Zr_{0.8}V_{0.2}O_3$, or a combination thereof.

15. The solid electrolyte of claim 1, wherein the solid electrolyte has an ion conductivity of about $1\times10^{-10}$ Siemens per centimeter or more at 25° C.

16. The solid electrolyte of claim 1, wherein the oxide has a diffraction peak from a (02$\bar{1}$) crystal plane, a (11$\bar{2}$) crystal plane, and a (22$\bar{1}$) crystal plane, when analyzed by X-ray diffraction using Cu Kα radiation.

17. The solid electrolyte of claim 1, wherein, a diffraction peak is present at a diffraction angle of about 26.7±0.5 °2θ, about 35±0.5 °2θ, about 39±0.5 °2θ, or a combination thereof, when analyzed by X-ray diffraction using Cu Kα radiation.

18. The solid electrolyte of claim 1, wherein the solid electrolyte has a pellet density of about 2.6 grams per cubic centimeter to about 5.1 grams per cubic centimeter.

19. A metal air battery comprising:
a cathode;
an anode; and
an electrolyte between the cathode and the anode,
wherein the cathode, the anode, the electrolyte, or a combination thereof, comprises the solid electrolyte of claim 1.

20. The metal air battery of 19, wherein the anode comprises lithium and the cathode is configured to use air as an active material.

21. An electrochemical device comprising:
the solid electrolyte of claim 1.

22. The electrochemical device of claim 21, wherein the electrochemical devices comprises an anode; a cathode; and the solid electrolyte is between the anode and the cathode.

23. The electrochemical device of claim 21, wherein the electrochemical device is a battery, an accumulator, a supercapacitor, a fuel cell, a sensor, or an electrochromic device.

24. A method of preparing a solid electrolyte, the method comprising:
mixing a lithium precursor, and an M1 precursor, to prepare a precursor mixture; and
heat-treating the precursor mixture to prepare the solid electrolyte of claim 1, and an M2 precursor, and an X precursor are optionally added to the precursor mixture.

25. The method of claim 24, wherein heat-treating of the precursor mixture comprises heat-treating at about 400° C. to about 950° C.

26. The method of claim 24, further comprising pulverizing the heat-treated precursor mixture to form a pulverized product; and
heat-treating the pulverized product.

27. The method of claim 26, wherein heat-treating of the pulverized product comprises heat-treating at about 500° C. to about 1300° C.

28. The method of claim 26, further comprising pressing the pulverized product to form a pellet prior to the heat-treating of the pulverized product.

29. A protection layer for a lithium battery, the protection layer comprising:
the solid electrolyte of claim 1, wherein the solid electrolyte is disposed on a cathode or an anode.

* * * * *